Jan. 4, 1944.  F. M. SHULL  2,338,671

PHOTOGRAPHIC PRINTING APPARATUS

Filed Dec. 6, 1941

FRANCIS M. SHULL
INVENTOR

BY *Newton M. Perrins*
*Rolla N. Carter*

ATTORNEYS

Patented Jan. 4, 1944

2,338,671

UNITED STATES PATENT OFFICE 2,338,671

PHOTOGRAPHIC PRINTING APPARATUS

Francis M. Shull, Rochester, N. Y., assignor to Eastman Kodak Company, Rochester, N. Y., a corporation of New Jersey Application December 6, 1941, Serial No. 421,973

1 Claim. (Cl. 88—24)

This invention relates to photographic printing apparatus and more particularly to an arrangement of the illuminating system in a printer so a single light source provides a beam of light incident on the printing window at right angles thereto, and also provides a uniformly bright field for positioning and judging the record from a region off the perpendicular axis of the record.

In positioning and judging a record in a printing window prior to the printing operation, it is generally necessary for the operator to observe the record at an acute angle, while in printing it is always desirable, if not absolutely necessary, to illuminate the record perpendicularly. In accordance with the present invention, a single source of light is so arranged that both of these desirable features are secured.

The invention will be readily understood from the following description when read in connection with the accompanying drawing in which.

Figure 1:
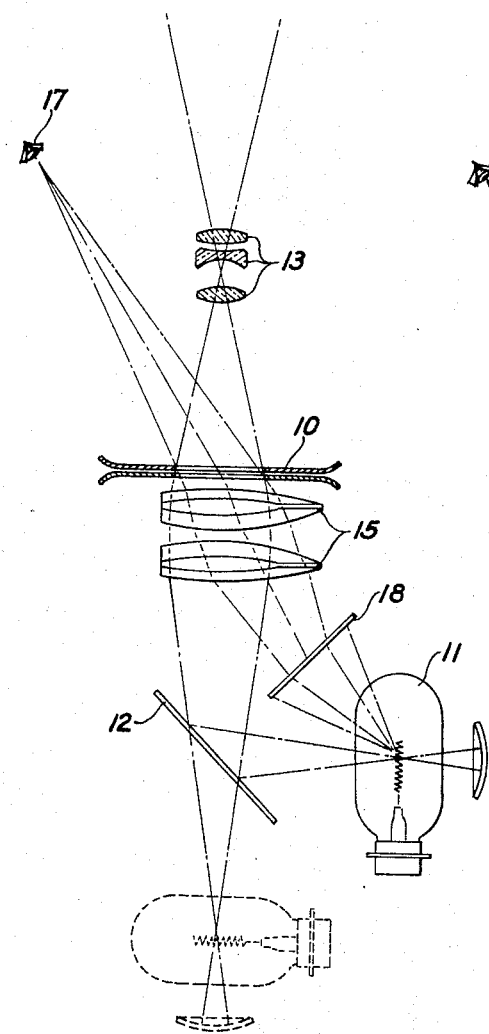
Fig. 1 shows diagrammatically the preferred form of the invention.
Figure 2:
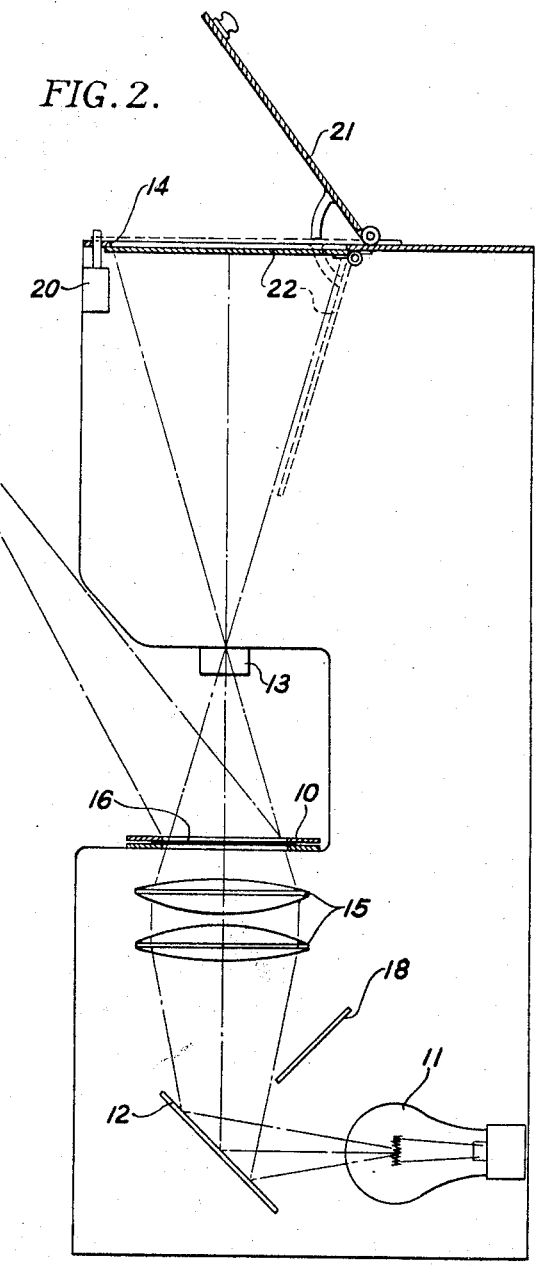
Fig. 2 shows schematically the preferred form embodied in a projection printer.

Referring to the drawing in which like reference characters designate like parts throughout, a printing window 10 adapted to support a record to be printed is arranged to be illuminated by a lamp 11 by means of a mirror 12 arranged and positioned to direct light from the lamp 11 perpendicularly onto the printing window 10. If, as shown, the printer is of the projection type, the record held in the window 10 is imaged in a well-known manner by a suitable lens 13 onto a panel 14 for supporting the light-sensitive material, usually paper. In order that the illumination of the printing window 10 may be more intense, suitable condenser lenses 15 are positioned between the lamp 11 and the window 10. When, as shown in Fig. 2, a record 16 to be printed is placed in the window 10, the eye 17 of the operator occupies a position off the optic axis of the printer and, in order for the record 16 to be positioned and judged correctly, it is desirable that the record 16 be illuminated with diffuse light and from such an angle as to be substantially aligned with the eye 17 of the operator. In accordance with the present invention, this is accomplished by positioning the lamp 11 at an angle to the optic axis of the printer so that it is in substantial alignment of the printing window 10 and the eye 17 of the observer. This judging illumination coming from an acute angle is preferably rendered diffuse as by inserting in this judging beam a diffusing medium such as an opal glass 18. It is to be noted that this diffusing medium 18 does not intercept the beam of light falling perpendicularly on the window 10 and, therefore, the printing may be done with specular light falling on the record 16 which is generally desirable, especially in projection printing.

Figure 3:
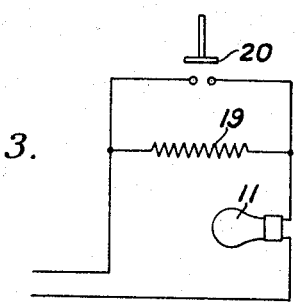
Fig. 3 shows a suitable wiring diagram for the printing lamp.

The brightness of the lamp 11 for a printing operation is generally much greater than that desired for judging and, in accordance with the usual practice, the lamp 11 is preferably provided as shown in Fig. 3 with a series resistance 19 arranged to be shunted by a switch 20 during a printing cycle. As shown in Fig. 2, the switch 20 may be arranged near the paper holding panel 14 so as to be actuated when the paper holding platen 21 is lowered to initiate a printing cycle. Also, in accordance with the usual practice, I prefer to provide a shielding member 22 for protecting sensitive material in position on the panel 14 during judging and positioning of the record 16. This shielding member 22 may be suitably coupled, as shown, so as to be displaced to nonshielding position shown by broken lines when the platen 21 is moved to printing position.

From the above description of the invention as applied to a particular form of printer, it will be evident that it is adapted to many forms of printers and it will be obvious that the novel illuminating arrangement of the invention is not restricted to the specific arrangement illustrated for explaining the invention.

What I claim as new and desire to secure by Letters Patent of the United States is:

In a photographic printer having a window for supporting a photographic record normal to a printing axis, a light source positioned off said axis for providing a record viewing axis obliquely to the printing axis, a diffusing screen positioned between said light source and said window and on said viewing axis to provide diffused light along said viewing axis to permit the positioning and judging of the record at said window, and a mirror positioned on said printing axis to reflect specular printing light from said light source perpendicularly onto said window.

FRANCIS M. SHULL.